Feb. 17, 1931.　　　　J. R. FREEZE　　　　1,793,281
SPIRAL PIPE FORMING MACHINE
Filed Dec. 5, 1924　　　3 Sheets-Sheet 1

INVENTOR:
Jonathan R. Freeze
BY
Allen T. Alen
ATTORNEYS.

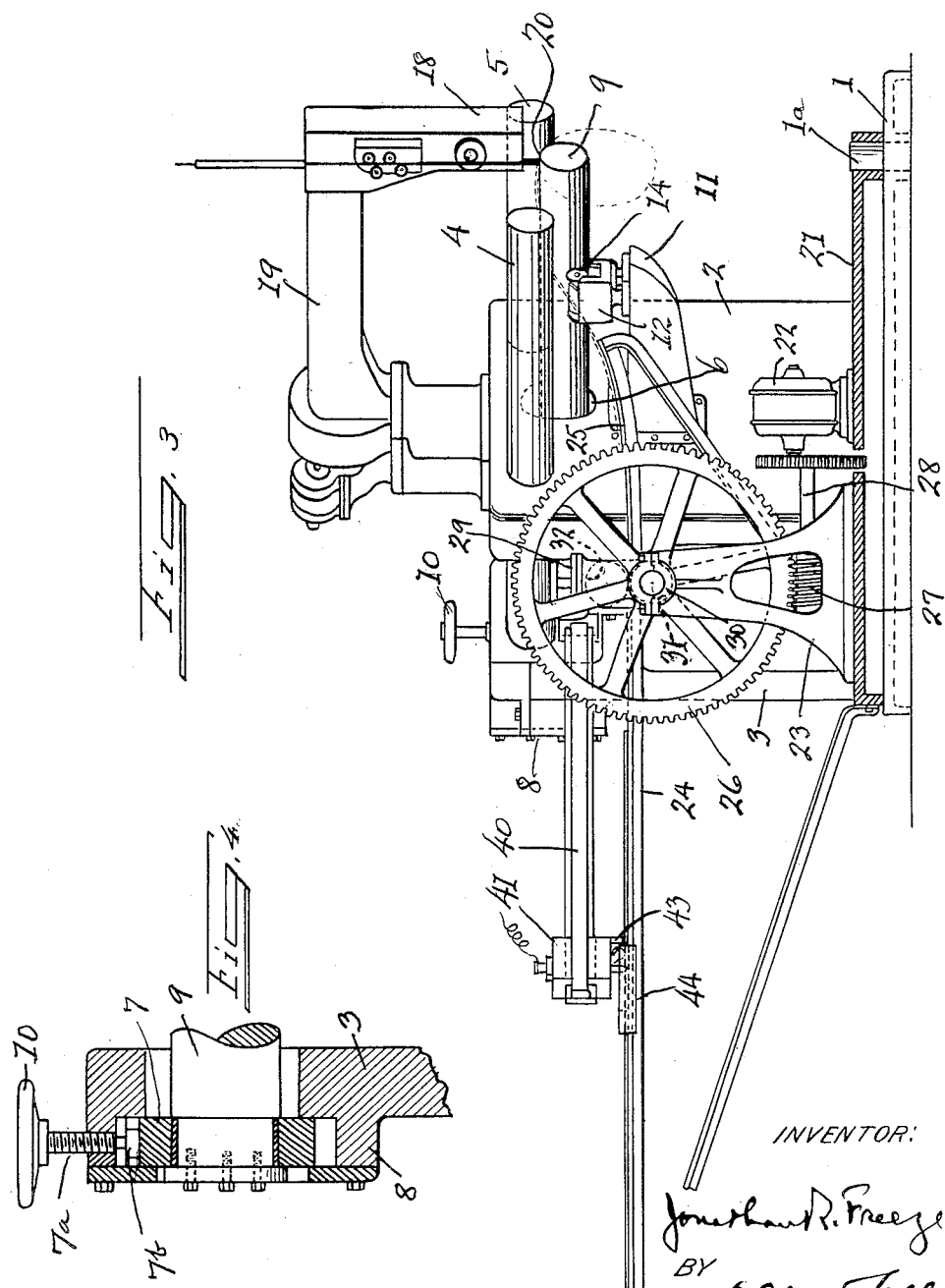

Feb. 17, 1931. J. R. FREEZE 1,793,281
SPIRAL PIPE FORMING MACHINE
Filed Dec. 5, 1924  3 Sheets-Sheet 3
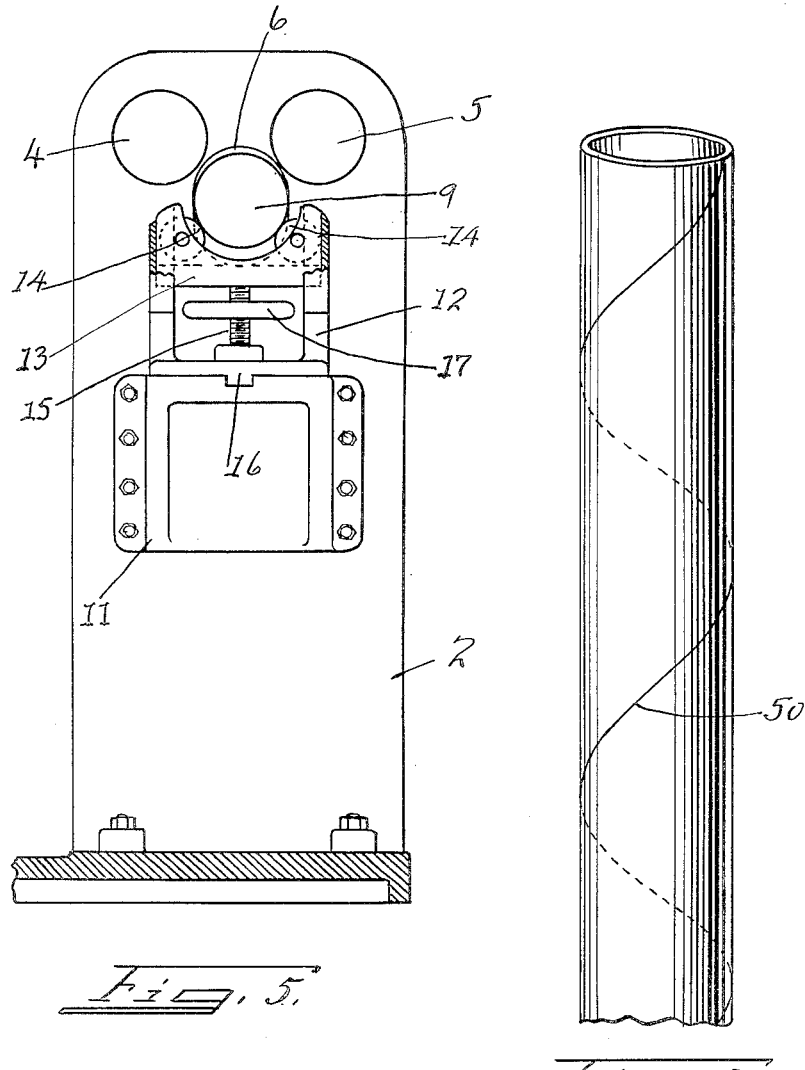
INVENTOR:
Jonathan R. Freeze
BY
Allen & Allen
ATTORNEYS.

Patented Feb. 17, 1931

1,793,281

UNITED STATES PATENT OFFICE

JONATHAN R. FREEZE, OF MIDDLETOWN, OHIO, ASSIGNOR TO THE AMERICAN ROLLING MILL COMPANY, OF MIDDLETOWN, OHIO, A CORPORATION OF OHIO

SPIRAL-PIPE-FORMING MACHINE

Application filed December 5, 1924. Serial No. 754,022.

My invention relates to machines for forming spiral pipe from sheet metal, and particularly to the formation of butt welded spiral pipe, in which there is no overlap of the spiral turns upon each other, thereby providing a pipe with a smooth interior.

There have been proposed a number of ways of making spiral pipe, none of which are easy of operation, or as rapid as desirable. I know of no machine in use which provides for the formation of spiral pipe which is butt welded by arc welding applied continuously to the pipe as the spiral curves are developed in the sheet.

It is the object of my invention to provide an effective device for forming spirals in a sheet of metal, which device operates on the principle of forcing the sheet through the forming element, as distinguished from carrying it through a forming element by a movable part in engagement therewith.

It is my object to provide for adjustability of the machine with regard to pitch of the spiral and diameter of the pipe, and to provide for a mode of forming the spiral such that the advancing edge of the unformed metal sheet or strip will be in contact with the curved edge that is passing out of the former, to the end that arc welding can take place at this point in order to form butt welded pipe. I do not wish to limit the application of my machine to butt welded pipe, however, as it could be used for seamed pipe, riveted pipe and similar structures.

I accomplish my objects above stated and other advantages to be noted, such as welding pieces to each other endwise as they progress through the machine so as to form a continuously fed metal body without stoppage, by that certain construction and arrangement of parts to be hereinafter more specifically pointed out and claimed.

In the drawings:

Figure 3 is a front elevation of the device.

Figure 4 is a detail section of the rear sliding journal for the forming roll.

Figure 5 is a side elevation of the machine taken at about 45 degrees from Figure 3.

Figure 6 is a perspective view of a piece of spirally wound butt welded pipe.

Figure 1:
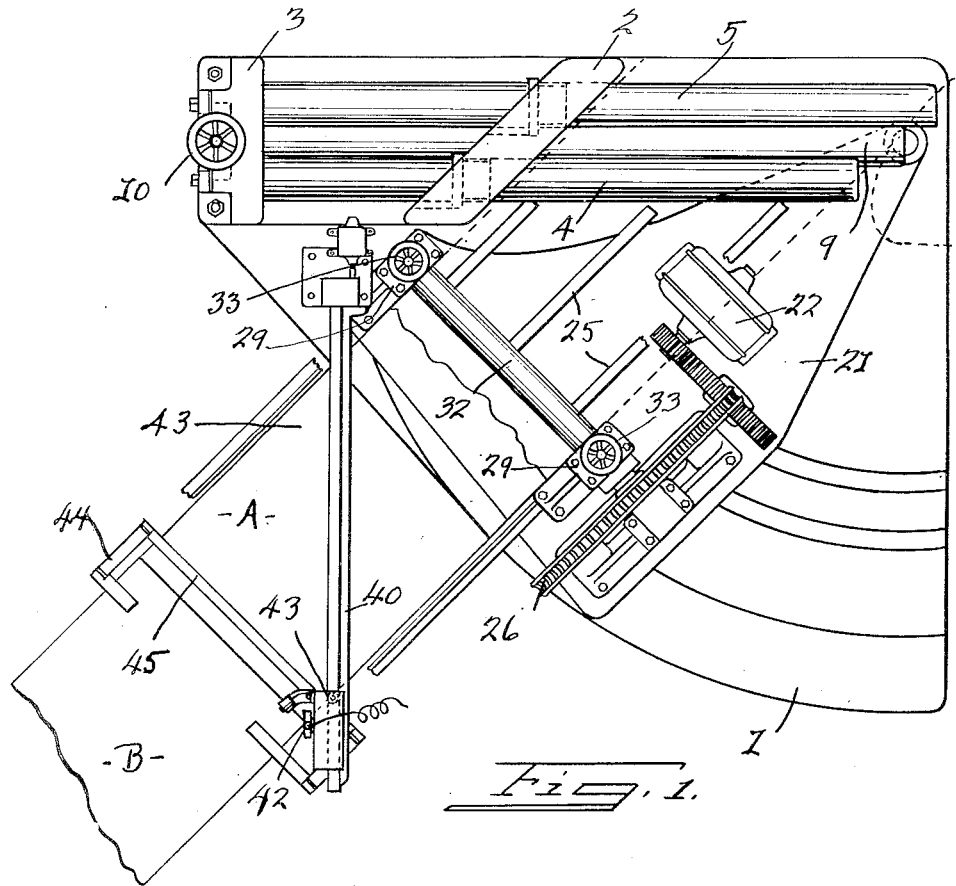
Figure 1 is a top plan view of the device.
Figure 2:
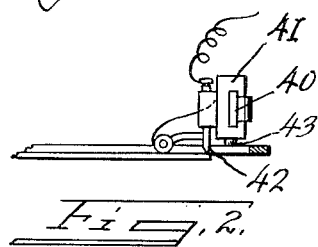
Figure 2 is a detail end elevation of the continuous welder.

The machine is formed on a base 1, from which projects a standard 2, and a standard 3. Arranged in the two standards, in this instance in fixed relation, are two round bars 4 and 5. These two bars may be made so as to revolve, or be driven, if desired, but in the simplest form selected for illustration the bars or rolls are fixed, and set in a horizontal plane, parallel with each other and interspaced. The roll or bar 4 is shorter than 5.

Arranged to slide in a vertical slot 6 in the standard 2, and set in a movable journal 7 in the standard 3 is a revolving idle roll 9, in this instance of the same diameter as the rolls 4 and 5. A hand wheel 10 controls the movable housing at the standard 3, and on a projection 11 from the standard 2 is a frame 12 in which slides a U shaped block 13. This U shaped block has a pair of rollers 14 therein, on which the front of the roll 9 finds a seat. A screw 15 having its lower end threaded in the boss 16 of the frame 12, engages as an abutment against the block 13. The hand wheel 17 fast on the screw serves to revolve it and thus adjust the height of the support of the forward end of the roll 9. The roll 9 is held parallel and below the rolls or bars 4 and 5, and is of a length at the front end which lies between the lengths of the rolls 4 and 5.

The rear journal 7 slides in a bracket 8 mounted on the standard 3. The screw 7a is threaded through a boss on the top of the bracket and has a flanged head 7b engaging in a T slot in the top of the journal. The detail of this structure is not important, as any form of adjustable journal could be provided.

The base is provided with a post 1a which for a machine to make butt welded pipe is placed under the end of the roll 9, which projects beyond the roll 4. Directly above the same point on the roll 4, is an arc welder of any desired type, as indicated at 18, supported on an arm 19 that is mounted on a projection from the standard 2 and extends so that its welding point at 20 is on the top of the roll 9 directly above the center of the post 1a.

A frame is mounted on the post 1a, so as to revolve thereon. This frame has a base 21 on which is a motor 22. The base has a vertical standard 23, which supports a table 24. The table has some material supporting brackets 25, which project toward the three rolls and are bent slightly upwardly to carry a piece of metal into the space between the roll 4 and the roll 9.

On the standard 23 is a large bull gear 26 driven by a worm 27 on the motor driven shaft 28. There are two small two high roll housings 29 of any desired type mounted at the sides of the table, in which the lower roll 30 is supported, this roll having a spindle 31 on which the bull gear is mounted. There is also mounted in said housings an upper roll 32, which is held down against the roll 30, by means of screws 33, in the usual manner in two high pinch roll structures.

A detailed illustration of the roll housings is not believed to be called for, as it forms no pertinent detail of the invention and is a structure well known in the art.

From the description it will be evident that no matter what angle is given to the pinch roll table, by swinging it on the pivot post as an axis, a straight line drawn along the table that intersects the arc welding point on the lower forming roll, in any position, will intersect that point in any other position.

In the device shown the line so drawn will coincide with the right hand end of the pinch roll device, so that sheets fed along by the pinch rolls are kept over to the right, and the right hand advancing edge of the sheets will pass over the arc welding point.

The body of the sheet as fed or pushed forward, will be thrust up between roll 4 and roll 9 and be pushed over the top of roll 9 and under roll 5, this forming a spiral due to the angular line of feed.

The angle to which the feed device is swung controls the pitch of the spiral. The adjustment of the roll 9 controls the diameter of the spiral. Thus the roll 9 may be adjusted downwardly until the sheet will pass clear without any distortion under the roll 9, in which there would be no curve at all. As the roll 9 is pressed more and more upwardly the curve becomes of less and less radius until the diameter of the spiral formed would be approximately that of the roll 9.

The angular adjustment of the sheet feeding means depends upon the desires of the operator as to the relation of the meeting edges of the spiral bends. In a process for forming butt welded pipe, the frame will be swung to such an angle that the pitch of the spiral will bring the left hand edge of the piece after it has been bent, into coincidence with the advancing right hand edge of the unbent metal. When the sheet or strip of metal is narrow the pitch of the spiral will have to be different from that when the sheet or strip is wide, as will be obvious from consideration of the resultant bending action imparted to the metal.

Since the right hand edge of the piece is advanced in the particular construction described so that it passes directly under a continuous welding arc, it is evident that by controlling the spiral to the desired degree, the left hand edge of the metal already bent, can be brought into butted relation with the said right hand edge, and a continuous butt welded joint formed simultaneously with the feeding of the metal. Also it is evident that the formed spiral pipe will feed directly off the end of the middle or lower roll, rotating as it does on its own axis, so that once started the machine will form butt welded pipe of the length that metal is provided to accomplish.

In order to avoid stoppage until a pipe of the desired length has been formed, I provide an arm of T-shape in cross section, as indicated at 40, which extends at an angle across the feed table. Sliding on this arm is an arc welder 41, having the welding point at 42. The welder box has a depending roller 43, by means of which it is fed.

When a sheet A comes to an end, during its feed by the pinch rolls, the operator clamps another sheet B to it, in such a relation as to butt against the rear edge of sheet A. The clamp as indicated at 44, has a cross bar 45 which will lie on the top of sheet A.

When the cross bar hits the roller 43, the arc welder is forced along the bar, taking a path slantwise of the feed table, moving in time with sheet A. The welding is started along the butt joint at the right, and the travel of the welder will be across the sheet, maintaining its relation of welding all the way across the butt joint.

Thus the operator will provide endwise welded pieces of metal to the machine, in order to make the desired length of pipe. The cross welder has been shown close up to the pinch rolls, and if it is too difficult to take off the clamp without stopping the machine, the welder device will be moved further away from the rolls.

The pipe formed by my machine is illustrated in Figure 6. The butt joint 50 is welded on the outside of the spiral leaving the interior of the pipe smooth.

The use of two fixed rolls, in connection with the adjustable intermediate roll, is the simplest mode in which my object can be accomplished, since if the rolls 4 and 5 were duplicated in a circular arrangement around the central roll, the adjustment for diameter of pipe could not be so easily accomplished. Such an arrangement would operate well as a spiral forming device, however, operating on a similar principle to the structure described.

One of the great advantages of my device is that there is but little power required, since the sheet is not formed by a clamping action, and is not forced lengthwise through a tubular mandrel, as has been proposed in riveted pipe.

Having thus described my invention, what I claim as new and desire to secure by Letters Patent, is:—

1. In a spiral pipe forming machine the combination of means for feeding metal toward a forming means at an angle thereto and a forming means adapted to force the metal to assume a curved shape, whereby the angularity of feed results in a spiral curving of the metal, and arc welding means mounted in movable relation to the feeding means, so as to move in a diagonal line across the feeding path, for uniting the edges of metal pieces lengthwise to furnish continuous metal to the feeding and forming means.

2. In combination with means for feeding pieces of metal, a supporting bar extending diagonally across the path of the metal being fed, an arc welding device mounted slidably on said bar, and means for retaining the rear edge of one piece of metal being fed, to the forward edge of another piece of metal, said retaining means having an abutment to engage the arc welding device, thereby moving it across the line of feed in time with the advance of the rear edge of the piece being fed, for the purpose described.

3. In a spiral pipe forming machine, means for feeding a strip of metal, forming means for imparting a permanent spiral set to the metal, said means including an internal element against which the strip is forced into tight contact by members on each side thereof and electric means applied to the strip at said point of contact to weld the edges of the strip together while under the tension referred to.

4. In a spiral pipe forming machine, means for feeding a strip of metal, forming means for imparting a permanent spiral set to the metal with the strip edges abutting each other, said means including an internal element against which the strip is forced into tight contact, and electric welding means applied to the abutting edges of the strip at said point of contact, to weld the abutting edges continuously together.

5. In a spiral pipe forming machine, means for feeding a strip of metal and forming means to which said strip is fed for causing said strip to form into a spiral, said means comprising an intermediate roll, and rolls located on each side thereof, between which series of rolls the strip is fed at a selected angle, said strip passing over the top of the intermediate roll, and beneath the other rolls, and said other rolls so positioned as to engage the strip at a level below the level of contact with the intermediate roll, and means for welding the strip at the spiral joint thereof, said means applied over the intermediate roll.

6. In a spiral pipe forming machine, means for feeding a strip of metal and forming means to which said strip is fed for causing said strip to form into a spiral, said means comprising an intermediate roll, and rolls located on each side thereof, between which series of rolls the strip is fed at a selected angle, said strip passing over the top of the intermediate roll, and beneath the other rolls, and said other rolls so positioned as to engage the strip at a level below the level of contact with the intermediate roll, and means for welding the strip at the spiral joint thereof, said means applied over the intermediate roll, and a supporting element beneath said intermediate roll.

7. In a spiral pipe forming machine, means for feeding a strip of metal, and forming means to which said strip is fed for causing said strip to form into a spiral, said means comprising an intermediate roll, and rolls located on each side thereof, between which series of rolls the strip is fed at a selected angle, said strip passing over the top of the intermediate roll, and beneath the other rolls, and said other rolls so positioned as to engage the strip at a level below the level of contact with the intermediate roll, and means for electrically welding the strip at the spiral joint thereof, said means applied over the intermediate roll.

8. In a spiral pipe forming machine, means for feeding a strip of metal, and forming means to which said strip is fed for causing said strip to form into a spiral, said means comprising an intermediate roll, and rolls located on each side thereof, between which series of rolls the strip is fed at a selected angle, said strip passing over the top of the intermediate roll, and beneath the other rolls, and said other rolls so positioned as to engage the strip at a level below the level of contact with the intermediate roll, and means for welding the strip at the spiral joint thereof, said means applied over the intermediate roll, said intermediate roll being of less diameter than the spiral formed thereover.

9. In an apparatus for converting a metal strip into a spirally wound tube with its convolutions laid in the same axial plane, cylindrical forming devices arranged at a divergent angle with relation to the line of movement of the metal strip, in combination with constantly driven rollers acting positively to force the said strip into the forming devices to impart the desired tubular formation to the said strip with its edges in abutting proximity for welding along the spiral line thus formed.

10. In an apparatus for making spirally welded tube from a metal strip, means for converting a metal strip into a tube with the convolutions of the strip disposed in the same longitudinal plane and the abutting or contiguous edges thereof spirally of the tube, in combination with means for conducting an electric arc to the spirally disposed edges of the strip to fuse and weld the same during the formation of the tube.

11. In an apparatus for manufacturing spirally welded pipe, means for converting a flat metal strip into tubular form with the abutting or contiguous edges of such strip disposed spirally therein and the convolutions of the strip in the same longitudinal plane, in combination with positively acting feeding means for forcing the metal strip into the converting means so as to impart the desired tubular shape thereto, and means for arc welding the said edges along the spiral line to produce an integral structure.

12. In an apparatus for manufacturing spirally welded pipe, means for converting a flat metal strip into a tube with the abutting or contiguous edges of the strip disposed spirally of the tube, in combination with means for supplying welding material at the spiral line formed by such edges, and means for conducting an electric arc for fusing the said edges and the welding material to form an integral tubular structure.

13. In a tube making machine, continuously operating means for feeding sheet metal tube making material, forming devices to receive such material as fed and convert it into spirally-wound tubular form with the convolutions extending in the same plane and the edges in abutting proximity, in combination with synchronously operating arc welding devices adapted to fuse and weld the said edges as the tube is being formed.

14. In a tube making machine, continuously operating means for feeding a strip of sheet metal, means for permanently connecting the ends of metal strips in succession to provide a continuous supply of strip material, means for converting the strip material into a spirally-wound tube during the feeding movement, in combination with means for fusing and welding the tube along the spiral line thus formed, to constitute an integral tubular structure.

15. In a tube making machine, devices for imparting a spirally-wound tubular form to a strip of sheet metal, and continuously operating means for feeding the strip into the tube forming devices, in combination with a continuously operating arc welding device adapted to fuse and unite the edges of the sheet metal strip along the spiral winding line during the formation of the tube to constitute an integral structure.

16. In a tube making machine, devices for imparting a spirally-wound tubular form to a strip of sheet metal, and means for feeding the strip into the forming devices, in combination with means operative during the feeding movement for uniting the rear end of the strip thus treated to the leading end of a second strip, to constitute a continuous supply of tube forming material.

17. In a tube making machine, devices for imparting a spirally-wound tubular form to a strip of sheet metal, and means for feeding the strip into the forming devices, in combination with means for uniting the rear end of the strip thus treated to the leading end of a second strip, to constitute a continuous supply of tube forming material, the said uniting means including transverse welding devices operative during the feeding movement of the strip.

18. In a tube making machine, devices for imparting a spirally-wound tubular form to a strip of sheet metal, and means for feeding the strip into the forming devices, in combination with means for uniting the rear end of the strip thus treated to the leading end of a second strip, to constitute a continuous supply of tube material, the said uniting means including means for holding the ends of the strips in abutting proximity during the feeding movement of the strips, and transverse welding devices movable with the holding means.

19. In a tube making machine, devices for imparting a spirally-wound tubular form to a strip of sheet metal, and means for feeding the strip into the forming devices, in combination with means for uniting the rear end of the strip thus treated to the leading end of a second strip, to constitute a continuous supply of tube forming material, the said uniting means comprising a carriage with clamps to engage the said ends and move with the strips, and transverse welding devices supported by and movable with the carriage.

20. In a tube making machine, devices for imparting a spirally-wound tubular form to a strip of sheet metal with the convolutions thereof in the same plane, means for feeding the strip into the forming devices, and means for electrically welding the tube along the spiral line formed by the edges of the strip, in combination with automatically operating devices to weld the abutting ends of strips in succession to produce a continuous supply of tube forming material.

21. In an apparatus for making spirally welded pipe, means for converting a metal strip into a tube with the convolutions thereof disposed in the same longitudinal plane and the abutting or contiguous edges thereof spirally of the tube, and means for conducting an electric arc to the spirally disposed edges of the strip to fuse and weld the same and form an integral tubular structure.

22. In an apparatus for making spirally welded pipe, means for converting a metal strip into a tube with the convolutions thereof disposed in the same longitudinal plane and the abutting or contiguous edges thereof spirally of the tube, and means for conducting an electric arc to the spirally disposed edges of the strip during the formation of the tube to fuse and weld the same into an integral tubular structure.

23. In a tube making machine, devices for imparting a spirally-wound tubular form to a strip of sheet metal with the convolutions thereof in the same plane and the edges in abutting or contiguous relation, means for feeding the strip to the tube forming devices and imparting rotation to the spirally-wound tube during its formation, and means for conducting an electric arc to the spiral line formed by the meeting edges of the strip while the tube is in rotation, to fuse and weld the latter into an integral structure.

JONATHAN R. FREEZE.